United States Patent Office.

AMOR SMITH, OF BALTIMORE, MARYLAND.

Letters Patent No. 99,250, dated January 25, 1870.

IMPROVED PROCESS OF RENDERING LARD, TALLOW, AND OTHER FATS.

The Schedule referred to in these Letters Patent and making part of the same.

*To all whom it may concern:*

Be it known that I, AMOR SMITH, of the city and county of Baltimore, and State of Maryland, have invented an Improved Process for Rendering Sweet Lard, Tallow, &c., of which the following is a specification.

This process is especially designed for use in rendering lard, tallow, &c., from fresh materials, in which decomposition has not commenced, and which, therefore, does not emit offensive odors in the process of rendering.

My improved process consists in using a close tank, within which the leaf-lard, tallow, or other fresh animal fat to be rendered is placed, and within which it is treated for reduction, by the introduction of a current of heated air, forced in by a pressure-blast from heaters, arranged separately from the tank, and having a temperature sufficient to crisp the cracklings; from which tank the lard, tallow, or other melted product flows into a receiver.

Various processes have heretofore been employed for this purpose. The most common one is that of boiling or frying the fat in open kettles, from which the product is drawn or dipped. Another mode in common use is to treat the fatty matter in a close tank or digester, by the use of steam, either introduced from a boiler or evaporated from the water, which forms an element of all such fatty substances. Another known mode is to boil or fry the fatty substances, enclosed in a close tank, by the direct application of heat to the external surface of the tank. This heat may be derived from actual contact with the fire, or by the use of a steam-jacket surrounding the digester. In the latter case it is necessary, in order to obtain the requisite amount of heat, to use steam of a high pressure, thereby greatly increasing the cost of the apparatus, and also the liability to accidents from explosion.

All of these processes are more or less objectionable, and it is the purpose of my improvement to obviate such objections, and provide a mode that shall be at once cheap and effective.

I have shown, in another application, filed concurrently herewith, an apparatus especially designed for applying my process to practice; but it will be readily apparent, that such apparatus may be greatly varied in construction, still being adapted to my improved process.

In this application, I desire to protect myself in the use of the process, irrespective of the particular apparatus employed.

For the application of this process, the apparatus required is a pressure-blast, which may be of any approved and known form; a heating-coil or other equivalent means of heating the air, according to well-known methods, in its passage from the pressure-blast to the tank or digester; and a close tank or digester, in which the fatty articles to be subjected to treatment are so placed as to be brought into contact with the heated air; and a receiver, connected with the tank by such a communication as will only permit the hot air to escape at a given pressure.

Any known pressure-blast may be used, capable of maintaining such a pressure as may be desired.

The heating-coil or other equivalent apparatus may be placed in a furnace, or in the uptake of a furnace, for utilizing the waste heat, according to well-known modes in common use in the arts, and the air to be introduced must have a temperature, at the close of the operation, sufficient to crisp the cracklings, though it need not be so hot at the beginning of the operation of rendering.

The temperature may be regulated by means of a second cold-air pipe, connected with the pressure-blast, and the tank having a stop-cock to shut it off entirely, or to admit more or less cold air, as desired.

The tank must be close, so as to confine the hot air under the amount of pressure required.

The discharge-openings or pipes must be so regulated, either by bending the pipes or by means of an external reservoir, into which the melted products may pass, in which the said fluid products may be maintained at a level above the openings into the discharge-pipes or orifices, that the melted products outside of the tank shall maintain some degree of pressure in the tank, and prevent the free escape of the current of hot air, and cause it, in passing out, to pass through or in close contact with the products submitted to its action.

In ordinary cases, where the lard, tallow, &c., are to be immediately drawn off, an external reservoir, such as shown in the apparatus already referred to as filed herewith, will be sufficient; and it will be only necessary to keep the fluid products at a height slightly above the top of the eduction-orifices, so that a very inconsiderable excess of pressure in the tank will cause the air and vapors to bubble out through such orifice, and escape into the open air.

In case it is desired to force the products to a higher elevation, the discharge must be through pipes carried upward, and in that case an increased pressure be applied to the blast.

The pressure of steam generated independently, or from the water of combination, has been used for this purpose; but I do not propose to make any use of the steam at all. So far as it may be produced in the process of rendering, it is to be carried away as a vapor of no value; and if it be generated at a pressure above the normal pressure of the atmosphere, the pressure of the air-blast must be made at least equal to its pressure, to prevent its flowing back through the induction-pipes.

What I claim, and desire to secure by Letters Patent, is—

The process of rendering fatty animal-products, by subjecting them, while confined in a close tank or digester, to the action of highly-heated air, introduced from a heater, under pressure, substantially as set forth.

In testimony whereof, I have signed my name to this specification, in the presence of two subscribing witnesses.

AMOR SMITH.

Witnesses:
R. MASON,
B. EDW. J. EILS.